United States Patent [19]

Koschek

[11] 4,143,270

[45] Mar. 6, 1979

[54] DEVICE FOR MONITORING A RADIOACTIVE FILLING LEVEL MEASURING INSTALLATION

[75] Inventor: Gerald Koschek, Waldbronn, Fed. Rep. of Germany

[73] Assignee: Seimens Aktiengesellschaft, Munich, Fed. Rep. of Germany

[21] Appl. No.: 798,945

[22] Filed: May 20, 1977

[30] Foreign Application Priority Data

Jun. 1, 1976 [DE] Fed. Rep. of Germany ....... 2624575

[51] Int. Cl.² ............................................. G01F 23/00
[52] U.S. Cl. .................................................. 250/357
[58] Field of Search ................... 250/357, 358 R, 497, 250/498

[56] References Cited

U.S. PATENT DOCUMENTS

| 3,396,870 | 8/1968 | Diamond et al. ................. 250/357 X |
| 3,643,096 | 2/1972 | Jeffries, Jr. et al. ............. 250/497 X |

Primary Examiner—Davis L. Willis
Attorney, Agent, or Firm—Kenyon & Kenyon, Reilly, Carr & Chapin

[57] ABSTRACT

In a filling level measuring installation with a radioactive radiator, which can be rotated within a lead shield from a peripheral operating position opposite the measuring receiver into a central safety position, a second radiation detector is arranged on a rearward extension of the measuring path in such a manner that in the safety position, its distance from the radiator is smaller than in its operating position, so that the output signal of the second detector can serve for monitoring the radiator position.

2 Claims, 1 Drawing Figure

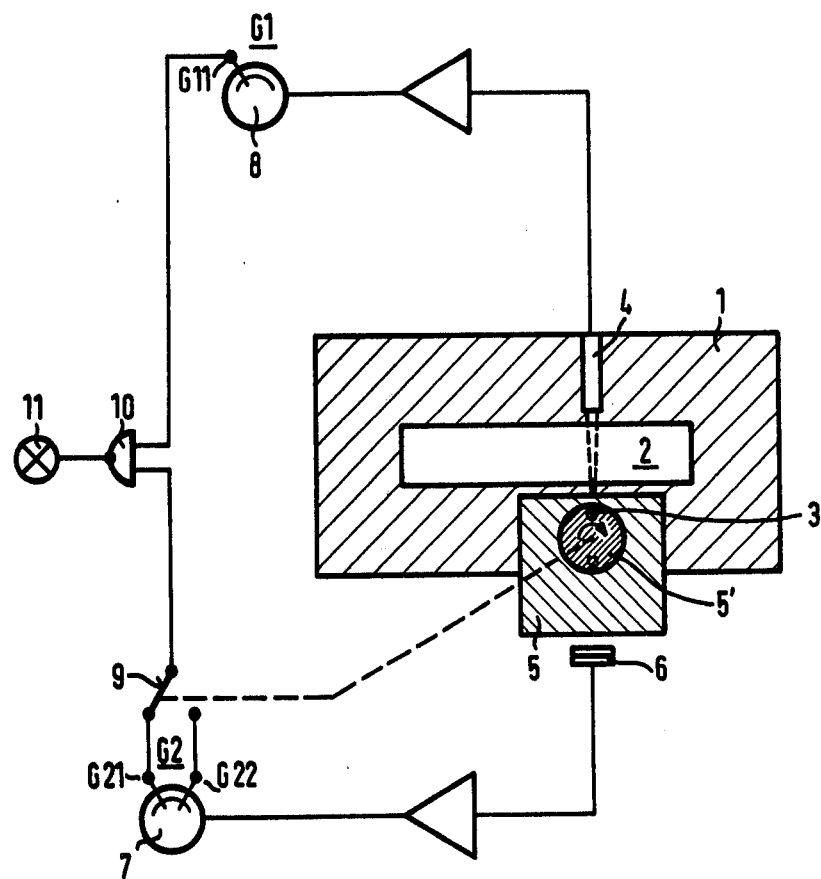

DEVICE FOR MONITORING A RADIOACTIVE FILLING LEVEL MEASURING INSTALLATION

BACKGROUND OF THE INVENTION

This invention relates to a device for monitoring a radioactive filling level measuring installation, in which the radioactive radiator can be rotated within a lead shield from a peripheral operating position opposite the measuring receiver (scintillation counter) into a central safety position.

Such radioactive measuring installations have a preferred use in the steel industry for the measurement of mold filling levels in continuous casting plants.

In order to preclude danger to the operating personnel, it is required that the position of the radioactive radiator, which is installed in a place which is not easily accessible, as well as the operability of the measuring installation can be monitored at any time.

SUMMARY OF THE INVENTION

This can be achieved by a device of the type mentioned at the outset, by having a second radiation receiver arranged in such a manner that in the safety position, its distance from the radiator is smaller than in the operating position, and that the output signals of both receivers are fed to indicating and/or limit control devices.

In one preferred embodiment, the second radiation receiver is mounted at or in the lead shield on a rearward extension of the measurement direction. The magnitude of its output signal gives an indication the position of the radiator; i.e., if the radiator is in the operating position, the output signal of the second radiation receiver is small and if the radiator is in the safety position, it is large.

In order to prevent a false alarm due to the failure of one of the receivers and to automate the monitoring device, in accordance with a further embodiment of the present invention, the output signal of the measuring receiver is compared in a first limit control device with limits which are below the signal minima for the radiator in the operating position and in the safey position, and the output signal of the second radiation receiver is compared in a second limit control device, in the operating position of the radiator, with a limit below the signal minimum and in the safety position of the radiator, with a limit below the signal maximum, and a trouble alarm is released if at least one of the values drops below the limit.

It is possible thereby to monitor the radiator position as well as the functioning of the two receivers automatically.

BRIEF DESCRIPTION OF THE DRAWINGS

The single FIGURE is a schematic drawing of an embodiment of the present invention.

DETAILED DESCRIPTION OF THE INVENTION

A radioactive filling level measuring installation 2 is mounted in the wall of a continuous casting mold 1 shown in cross section. It consists essentially of a radioactive radiator 3, e.g., a rod radiator arranged perpendicular to the plane of the drawing, and a measuring receiver 4, e.g., a scintillation counter, mounted on the opposite wall. The operation of such a measuring arrangement is known in the art.

The radioactive radiator 3 is arranged rotatably within a lead shield 5 in such a manner that in the operating position shown it is located at the periphery of the lead shield 5 and opposite the measuring receiver 4, and that it can be swung, by rotating a cylindrical radiator mount 5', into a central safety position, as indicated in dotted lines in the figure. In this safety position, the effect of the lead shield 5 surrounding it on all sides is so great that any danger to the operating personnel is precluded. In order to monitor the proper rotation of the radiator 3 into the safety position, a second radiation receiver 6 is attached to the lead shield 5 in a rearward extension of the measuring direction. It is seen that the distance ratio of the radiator 3 in the operating position and safety position from the second receiver 6 is about 2:1. The magnitude of the output signal of the second receiver 6, amplified and fed to the indicator 7, therefore allows a conclusion as to the position of the radiator.

The output signal of the measuring receiver 4 is likewise amplified and used as the control variable for a filling level control device or is fed to a filling level indicator 8.

To automate the monitoring, limit control devices G1 and G2 are provided for the output signals of both receivers 4 and 6, which are symbolized here as limit contacts G11, G21, G22 at the indicators 7, 8. The limit contact G11 for the output signal of the measuring receiver in the first limit control device G1 is set so that it is below the signal minima occurring in the normal operation of the measuring device, i.e., the limit is below the output signal of the measuring receiver 4 with the radiator in the safety position and the mold empty as well as below the output signal occurring with the radiator in the operating position and the mold filled up to the limit of the measuring range. There is further the possibility, not shown here of monitoring the functioning of the receiver 4 with the radiator 3 in the operating position and with the mold empty, by arranging further limit contacts 95% of the expected signal minimum.

The output signal of the second radiation receiver 6, which can assume a minimum value and a maximum value corresponding to the two positions of the radiator, is compared in a second limit control device G2, while the radiator is in the operating position, with a limit below the signal minimum, and while the radiator is in the safety position, with a limit below the signal maximum. If the radiator 3 is in the operating position, the limit contact G21 is effective and has its output signal connected to the one input of a NAND gate 10, to the other input of which the output signal of the limit control device G1 for the measuring receiver 4 is connected. The output signals are connected such that when a limit is exceeded the output becomes a logical "0" i.e., in normal operation the output of gate 10 is logical "0" because of two logical "1" inputs.

If the radiator 3 is rotated into its safety position and the double-throw switch 9 operated, then the limit contact G22 is connected to the gate 10.

If the value falls below a limit, the output signal of the respective limit contact becomes zero, the gate 10 goes high, i.e., logical "1" and activates a trouble alarm, such as the lamp 11 illustrated.

What is claimed is:

1. A device for monitoring a radioactive filling level measuring installation, in which the radioactive radiator can be rotated within a lead shield from a peripheral operating position opposite a first measuring receiver into a central safety position, comprising:

(a) a second measuring receiver arranged in such a manner that its distance from the radiator is smaller in the safety position than in the operating position, (b) a first limit control device having limits which are below the signal minima with the radiator in the operating position and with the radiator in the safety position having as an input the output signal of the first measuring receiver, and (c) a second limit control device having as an input the output signal of the second measuring receiver having a limit below the signal maximum when the radiator is in the safety position, and having a limit below the signal minimum when the radiator is in the operating position, and (d) a trouble alarm coupled to said first and second limit control devices and responsive if one of said inputs falls outside a corresponding limit value.

2. A device according to claim 1, wherein said second receiver is mounted at or in the lead shield along a rearward extension of the measuring direction.

* * * * *